United States Patent [19]

Sun

[11] 4,387,179

[45] Jun. 7, 1983

[54] METHOD FOR THE PREPARATION OF ALKENYL AROMATIC MONOMER NITRILE COPOLYMER REINFORCED WITH RUBBERY COPOLYMER

[75] Inventor: Yun-Chung Sun, Midland, Mich.

[73] Assignee: The Dow Chemical Company, Midland, Mich.

[21] Appl. No.: 263,636

[22] Filed: May 14, 1981

[51] Int. Cl.$^3$ ............................................... C08F 2/16
[52] U.S. Cl. ................................... 524/458; 524/459; 524/460
[58] Field of Search .................................. 525/260, 263; 260/29.7 RP; 524/458, 459, 460

[56] References Cited

U.S. PATENT DOCUMENTS

| | | | |
|---|---|---|---|
| 2,694,692 | 11/1954 | Amos et al. | 525/316 |
| 3,439,065 | 4/1969 | Luftglass | 525/53 |
| 3,511,895 | 5/1970 | Kydonieus et al. | 525/193 |
| 3,903,200 | 9/1975 | Cincera et al. | 525/295 |
| 3,991,136 | 11/1976 | Dalton et al. | 525/310 |
| 4,017,559 | 4/1977 | Deets et al. | 525/71 |
| 4,221,883 | 9/1980 | Mott et al. | 525/316 |

*Primary Examiner*—J. Ziegler
*Attorney, Agent, or Firm*—R. B. Ingraham

[57] ABSTRACT

In the mass polymerization of an alkenyl aromatic nitrile rubber polymer blend such as ABS by the mass polymerization technique, improved physical properties are obtained in the resultant polymer by the incorporation of water into the mass polymerization process. During polymerization the pressure of the system must be maintained sufficiently high to prevent vaporization of the water.

12 Claims, 1 Drawing Figure

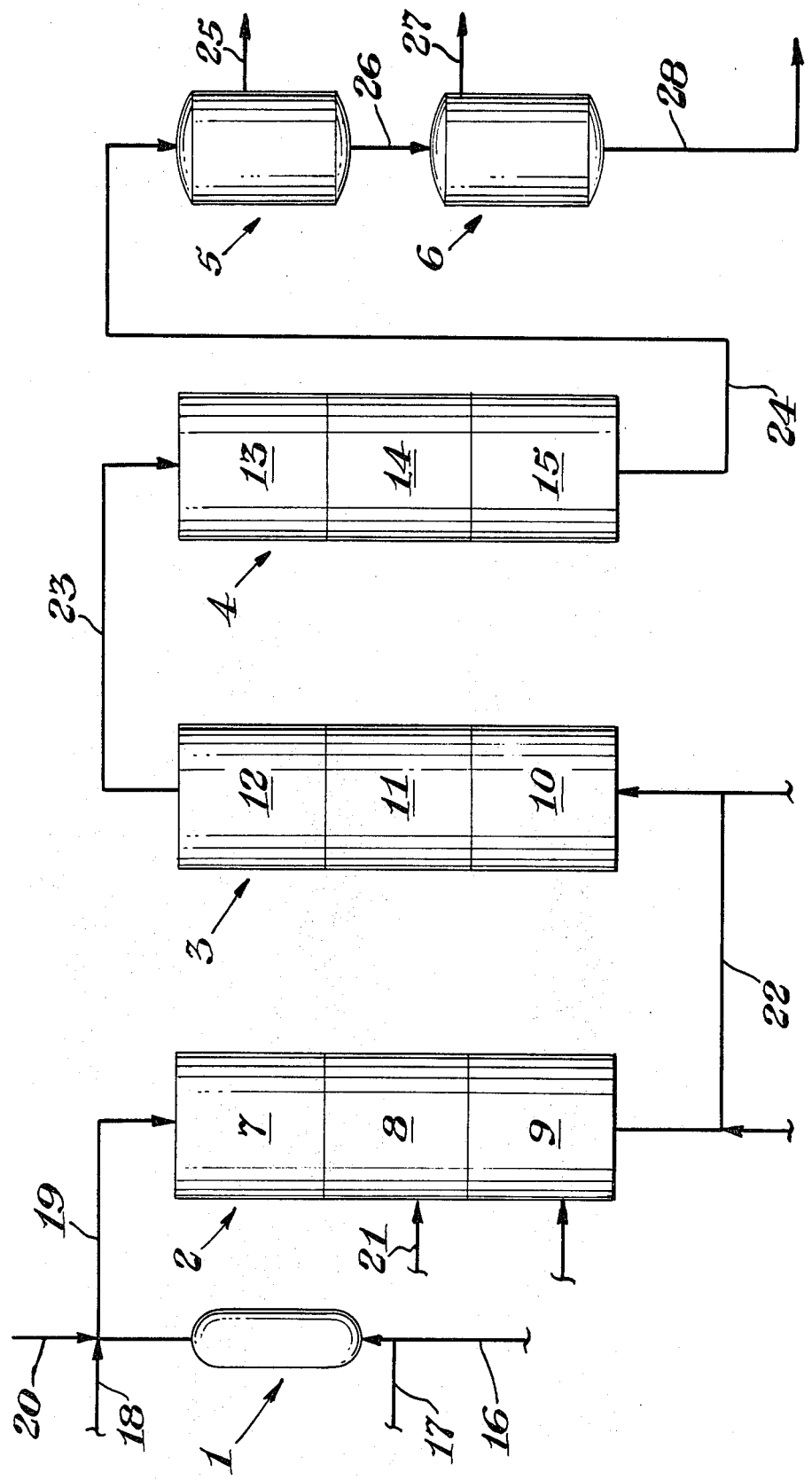

METHOD FOR THE PREPARATION OF ALKENYL AROMATIC MONOMER NITRILE COPOLYMER REINFORCED WITH RUBBERY COPOLYMER

Polymers of alkenyl aromatic monomers together with ethylenically unsaturated nitrile monomers reinforced with a rubbery polymer are typified by so-called ABS resins. The ABS resins generally are considered the polymers of styrene and acrylonitrile reinforced with a butadiene rubber and are exemplary of the present invention. Such polymer compositions may be prepared by a variety of techniques. For example a styrene and acrylonitrile copolymer may be melt blended with a butadiene polymer rubber by mechanically blending in an extruder, Banbury mixer, or like malexating device. Another method for the preparation of such ABS polymers is by the blending of a latex polymer of an appropriate rubber such as a polybutadiene with a styrene acrylonitrile matrix. Generally such a latex polymer is crosslinked to a sufficient degree that when it is dispersed in the styrene-acrylonitrile matrix, the original latex particles retain their identity. Frequently, in the preparation of such blends, it is desirable to graft onto the surface of the rubber latex a styrene-acrylonitrile copolymer which approximates the composition of the styrene-acrylonitrile matrix into which it will be blended. The latex may be either melt blended with a preformed styrene-acrylonitrile copolymer or alternatively the latex polymer grafted or otherwise may be dispersed in a mixture of styrene-acrylonitrile monomer and subsequently the monomers polymerized to provide the desired rubber reinforced polymer. Such polymerization may be by the so-called mass process or by the mass suspension process. Of the variety of processes available for the preparation of so-called ABS type polymers, one of the more desirable is the mass process. In the mass process, an appropriate rubber such as a polybutadiene is dissolved in a mixture of styrene and acrylonitrile, and oftentimes advantageously a solvent such as ethyl benzene, which is generally inert under the conditions of polymerization. The resultant solution of rubbery polymer in styrene-acrylonitrile monomer mixture is subsequently heated with agitation, with or without a free radical generating catalyst to initiate polymerization. As polymerization proceeds, usually some grafting of styrene-acrylonitrile polymer to the rubber reinforcing materials occurs, and as the concentration of styrene-acrylonitrile polymer increases, the rubber is no longer soluble in the mixture and precipitates out as a plurality of individual particles dispersed in a solution of styrene-acrylonitrile polymer in a mixture of styrene and acrylonitrile, and optionally a solvent if employed. If polymerization is continued, the resultant mass becomes increasingly viscous. When the desired degree of conversion of monomer to polymer is obtained, the unreacted monomer, solvent or other volatile material is removed, usually in one or more devolatilization stages wherein the reaction mixture is heated and generally subjected to subatmospheric pressure to remove the volatile materials therefrom. The devolatilized stream is then passed to a cooling and extruding device and most frequently extruded as a plurality of strands which are cut into short lengths to provide a mass of granules suitable for molding, extrusion and the like. The mass polymerization process for the preparation of ABS type resins has some marked advantages over such processes as the mass-suspension, latex blending techniques, and other polymer preparation techniques which require relatively large quantities of process water, which of course necessitates appropriate treatment facilities and means of disposing of the water without unreasonable contamination of the environment. The mass polymerization process for the preparation of such rubber reinforced polymers is not without its disadvantages. From a practical standpoint, an operating limit of rubber content is reached which is substantially below the amount of rubber which can be incorporated into a matrix such as a styrene-acrylonitrile polymer matrix by other processes. This primarily is due to the viscosity of the polymerizing mass, which if the rubber levels are excessively high, the viscosity becomes too great with agitation, and therefore heat transfer from the polymerizing mass becomes commercially impractical. Therefore, in the preparation of synthetic resinous materials, such as ABS resins by the mass process, it is highly desirable that for a given quantity of rubber, the maximum desirable physical properties be obtained; that is, that the rubber incorporated within the matrix polymer be used with maximum efficiency. The preparation of resins reinforced with rubbery polymers such as styrene-acrylonitrile polymer containing butadiene rubber is well-known in the art.

For example, U.S. Pat. No. 2,694,692 by Amos et al., describes a mass polymerization technique suitable for the preparation of impact resistant polystyrene and ABS resins wherein the technique of phase inversion is first disclosed. A further refinement of this technique is set forth in U.S. Pat. No. 3,243,481 issued to Ruffing et al.

Another variation of the mass polymerization technique is disclosed in U.S. Pat. No. 3,439,065 by M. A. Luftglass. Luftglass discloses that improved heat transfer is obtained in the mass or bulk polymerization technique if a minor quantity of water is added to the reaction mixture and the water permitted to boil to form steam, the steam condensed and returned to the reactor to act as a heat transfer medium.

Another variation of the mass or bulk polymerization technique is disclosed in U.S. Pat. No. 3,903,200 by Cincera et al., wherein two grafted latex polymers are added to a monomer mixture. The latex polymers are not completely dry and the water is removed from the mass by evaporation.

A still further variation is disclosed in U.S. Pat. No. 3,991,136 to Dalton et al., which discloses a method of producing an ABS polymer having a low residual monomer content. Dalton et al., disclose that suitable monomers such as styrene and acrylonitrile together with a grafted diene rubber are polymerized to at least about 90 percent conversion, and a third monomer is added to copolymerize with any remaining or at least a major portion of any remaining monomer in the reaction mixture.

U.S. Pat. No. 4,017,559 discloses the preparation of styrene-acrylonitrile type polymers employing a grafted chloroprene rubber and a grafted polybutadiene rubber in the presence of a metallic oxide.

U.S. Pat. No. 4,221,883 to Mott et al., discloses the preparation of rubber reinforced alkenyl aromatic resinous polymers and copolymers with acrylonitrile by the mass process and the incremental addition of rubber solution to the polymerizing mass, primarily to provide improved and more efficient use of rubber.

The teaching of the foregoing patents is herewith incorporated by reference thereto.

It would be desirable if there were available an improved process for the preparation of rubber reinforced alkenyl aromatic mono olefinically unsaturated nitrile polymers by the mass polymerization process.

It would also be desirable if there were available an improved method for the simple and direct preparation of rubber reinforced styrene-acrylonitrile polymers of the ABS type.

It would also be desirable if such a method were simple, direct, and involved minimal changes in existing mass polymerization procedures.

These benefits and other advantages in accordance with the present invention are achieved in a process for the preparation of a rubber reinforced alkenyl aromatic monomer, monoolefinically unsaturated nitrile copolymer wherein a polymerizable mixture of an alkenyl aromatic monomer and a monoolefinically unsaturated nitrile is provided, a diene rubber dissolved in the alkenyl aromatic monomer-monoolefinically unsaturated nitrile monomer to form a rubber containing polymerizable solution, heating the solution to initiate free radical polymerization, agitating the solution during at least the initial portion of the heating and polymerization until the rubber separates and forms a plurality of particles dispersed within a solution of alkenyl aromatic monomer-nitrile polymer dissolved in alkenyl aromatic monomer-olefinically unsaturated nitrile mixture, continuing the polymerization of the alkenyl aromatic monomer and olefinically unsaturated nitrile to at least about 50 weight percent conversion of the alkenyl aromatic monomer and olefinically unsaturated nitrile polymer to thereby form at least a partially polymerized reaction stream, removing volatile materials from the reaction stream, and recovering therefrom a copolymer of alkenyl aromatic monomer monoolefinically unsaturated nitrile copolymer reinforced by a plurality of rubber particles dispersed in the polymer, the particles having incorporated therein occlusions of the polymer of the alkenyl aromatic monomer and olefinically unsaturated nitrile, the improvement which comprises including within the polymerizable stream a minor proportion of water prior to the formation of the rubber particles and maintaining the polymerizable stream under a pressure sufficient to prevent vaporization of the water whereby a polymer of alkenyl aromatic monomer and olefinically unsaturated nitrile reinforced with rubber is obtained which has improved properties over polymer which is obtained in the absence of water.

A wide variety of monomeric materials may be employed in the practice of the present invention. Of particular advantage are alkenyl aromatic monomers. By the term "alkenyl aromatic monomers" is meant an alkenyl aromatic compound having the general formula

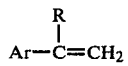

wherein Ar represents an aromatic hydrocarbon radical, or an aromatic halohydrocarbon radical of the benzene series, and R is hydrogen or the methyl radical. Examples of such alkenyl aromatic monomers are styrene, alpha-methylstyrene, ortho-methylstyrene, meta-methylstyrene, para-methylstyrene, par-ethylstyrene, ar-vinylzylene, ar-chloro-styrene, or ar-bromostyrene and the like. Olefinically unsaturated monomers suitable for the practice of the present invention include acrylonitrile, methacrylonitrile, ethacrylonitrile, and the like.

Preferred monomers for use in the practice of the present invention are styrene, paramethylstyrene, and acrylonitrile. Monomers of commercial purity are eminently satisfactory for the practice of the method of the present invention.

In accordance with the practice of the present invention, the alkenyl aromatic monomer is employed in a proportion of about 85 parts by weight to 15 parts by weight and the olefinically unsaturated nitrile from about 40 parts by weight of the alkenyl aromatic monomer to 60 parts by weight of the olefinically unsaturated nitrile. Water is generally employed in a proportion of about 3 to 15 weight percent based on the weight of the olefinically unsaturated nitrile. The reinforcing of rubber is generally employed in a proportion of about 10 to 30 weight percent of the combined weight of the polymerized alkenyl aromatic monomer and polymerized olefinically unsaturated nitrile.

A wide variety of reinforcing rubbers may be employed. Suitable reinforcing rubbers are diene rubbers or mixtures of diene rubbers, i.e., any rubbery polymers (a polymer having a glass temperature not higher than 0° C., and preferably not higher than −20° C., as determined by ASTM Test D-746-52T) of one or more conjugated 1,3 dienes, e.g., butadiene, isoprene, piperylene, chloroprene, etc. Such rubbers include homopolymers and interpolymers of conjugated 1,3 dienes with up to 40 percent by weight of one or more copolymerizable monoethylenically unsaturated monomers, and preferably up to 30 weight percent, such as monovinylidene aromatic hydrocarbons (e.g., styrene, an aralkystyrene, such as the o-, m- and p-methylstyrenes, 2,4-dimethylstyrene, the ar-ethylstyrenes, p-tert-butylstyrene, etc.; an alpha-alkylstyrene, such as alpha-methylstyrene, alpha-ethylstyrene, alpha-methyl-p-methylstyrene, etc.; vinyl naphthalene, etc.); ar-halo monovinylidene aromatic hydrocarbons (e.g., the o-, m- and p-chlorostyrenes, 2,4-dibromostyrene, 2-methyl-4-chlorostyrene, etc.); acrylonitrile, methacrylonitrile, alkyl acrylates (e.g., methyl acrylate, butyl acrylate, 2-ethylhexyl acrylate, etc.), the corresponding alkyl methacrylates, acrylamides (e.g., acrylamide, methacrylamide, N-butyl acrylamide, etc.); unsaturated ketones (e.g., vinyl methyl ketone, methyl isopropenyl ketone, etc.); alpha-olefins (e.g., ethylene, propyelne, etc.); pyridines, vinyl esters (e.g., vinyl acetate, vinyl stearate, etc.); isobutylene rubbers, rubbery polymers of ethylene and propylene, and the like. Chlorinated polyethylene is also employed with benefit.

Any desired diluent may be added to the polymerizable stream to reduce viscosity or provide additional heat transfer. The only requirement for the diluent is that it be generally unreactive under conditions of the reaction and be a solvent or dissolved in the alkenyl aromatic monomer olefinically unsaturated nitrile mixture and not cause the resultant polymer of the alkenyl aromatic monomer olefinically unsaturated nitrile polymerization to precipitate from solution. A particularly desirable diluent is ethylbenzene. Also such materials as benzene, toluene, and the like may be readily employed if desired.

Polymerization of the polymerizable mixture may be accomplished by thermal polymerization generally between temperatures of 80° C. to 170° C., or alternately any free radical generating initiator or catalyst may be used in the practice of the invention, including actinic radiation. Typical free radical generating catalysts which may be employed are monomer-capable peroxy and perazo compounds. Exemplary catalysts are di-tert-butyl peroxide, benzoyl peroxide, lauroyl peroxide, oleyl peroxide, toluyl peroxide, di-tert-butyl diperphthalate, tert-butyl peracetate, tert-butyl perbenzoate, dicumyl peroxide, tert-butyl peroxide, isopropyl carbonate, 2,5-dimethyl-2,5-di(tert-butylperoxy)hexane, 2,5-dimethyl-2,5-di(tert-butylperoxy)hexyne-3, tert-butyl hydroperoxide, cumene hydroperoxide, p-methane hydroperoxide, cyclopentane hydroperoxide, diisopropylbenzene hydroperoxide, p-tert-butylcumene hydroperoxide, pinane hydroperoxide, 2,5-dimethyl-hexane-2,5-dihydroperoxide, etc., and mixtures thereof.

If desired, small amounts of antioxidants are included in the feed stream, such as alkylated phenols, e.g., di-tert-butyl-p-cresol; phosphites such as trinonyl phenyl phosphite. Such materials in general may be added at any stage during polymerization. Optionally, a wide variety of diluents may be employed in the reaction, generally such diluents being present at a level less than about 20 percent of the weight of the reaction mixture, and beneficially at about 5 to 15 parts by weight per 100 parts of polymerizable components. Such diluents may be liquid materials which are generally non-reactive under polymerization conditions and are a solvent for the polymer produced, as well as the monomer. Such diluents include dimethylformamide, acetone, methylethylketone, ethylbenzene, xylenes. Beneficially, plasticizers may be added to the feed stream or at any intermediate stage of the polymerization. Such plasticizers or lubricants include butyl stearate, zinc stearate, mineral oil.

The invention is further illustrated but not limited by the following examples.

EXAMPLE 1

A continuous polymerization reactor of the single pass variety having 8 zones of temperature control was employed for a plurality of polymerizations. In each polymerization the first temperature zone was controlled at 100° C., while the 8th zone was controlled at 150° C., while zones 2 through 7 increased in temperature in a generally linear manner consistent with zone 1 at 100° C. and zone 8 at 150° C. The feed stream was a mixture of styrene, acrylonitrile, styrene-butadiene monomer soluble rubber, and ethyl benzene. The pressure in the reactor was maintained at about 100 pounds per square inch gauge. Material leaving the 8th zone was devolatilized and subsequently extruded into pellets, portions of the pellets were molded into test specimens and the physical properties determined. Six polymerizations were conducted; three with water in the feed and for purposes of comparison, three without water in the feed. The results are set forth in Table I.

TABLE I

Properties of ABS Base Product and Water Add Product Comparison

| Feed Composition | Tensile Yield (psi) | Tensile Rupture (psi) | Izod Impact Strength (ft. lb/in of notch) | % Elongation | Melt Flow Rate (g/10 min) |
|---|---|---|---|---|---|
| 50 parts Styrene<br>22 parts AN<br>11.5 parts SBR<br>16.5 parts Diluent | 6605 | 5840 | 4.9 | 3.4 | 1.7 |

TABLE I-continued

Properties of ABS Base Product and Water Add Product Comparison

| Feed Composition | Tensile Yield (psi) | Tensile Rupture (psi) | Izod Impact Strength (ft. lb/in of notch) | % Elongation | Melt Flow Rate (g/10 min) |
|---|---|---|---|---|---|
| 49.0 parts Styrene<br>21.56 parts AN<br>11.27 parts SBR<br>16.17 parts Diluent<br>2.0 parts Water | 6725 | 5605 | 6.9 | 5.4 | 1.0 |
| 48 parts Styrene<br>21 parts AN<br>14 parts SBR<br>17 parts Diluent | 5980 | 4965 | 5.6 | 4.4 | 1.4 |
| 47.04 parts Styrene<br>20.58 parts AN<br>13.72 parts SBR<br>16.65 parts Diluent<br>2.0 parts Water | 6115 | 4920 | 8.7 | 8.2 | 0.8 |
| 49.0 parts Styrene<br>22.2 parts AN<br>11.2 parts SBR<br>16.6 parts Diluent<br>1.0 parts Mineral Oil | 3320 | 2620 | 3.8 | 23.3 | 4.0 |
| 47.5 parts Styrene<br>21.5 parts AN<br>10.9 parts SBR<br>16.1 parts Diluent<br>1.0 parts Mineral Oil<br>3.0 parts Water | 3060 | 2615 | 5.1 | 40.4 | 3.0 |

As can be readily seen from the data set forth in Table I, polymerizations in accordance with the present invention employing water provide a product with substantially improved physical properties. Note the increase in the izod impact strength and the percent elongation of the polymerizations in accordance with the invention employing water in the feed. In each case the diluent employed was ethyl benzene.

EXAMPLE 2

Two polymerizations were conducted employing apparatus generally as depicted in the FIGURE. A feed stream was employed which consisted of a styrene-butadiene rubber commercially available under the trade designation of SOLAPRENE 308. Styrene, acrylonitrile, ethyl benzene, mineral oil and an antioxidant available under the trade designation of IRGANOX 1076 from the Ciba-Geigy Corporation. All percentages are based on the combined weights of the rubber, styrene acrylonitrile, ethyl benzene and mineral oil. The reactor system consisted of a monomer preheat tank designated by the reference numeral 1 which discharged to a first reactor 2, which in turn discharged to a second reactor 3. The reactors 2 and 3 were agitated. Reactor 3 in turn discharged to a reactor 4. Reactor 4 in turn was discharged to a first devolatilizer 5 and a second devolatilizer 6. The feed preheat 1 maintained the contents at a temperature of about 60° C. The first reactor 2 is divided into three temperature control zones, 7, 8 and 9 which had temperatures of 105° C., 107° C. and 107° C. respectively. The reactor 3 also had three temperature control zones, 10, 11 and 12, which had temperatures of 115° C., 120° C. and 125° C. respectively. The third reactor also had three temperature control zones designated by the reference numerals 13, 14 and 15 which had temperatures of 130° C., 140° C. and 150° C. respectively. The first devolatilizer 5 maintained a temperature of 170° C. and a pressure of about 1000 millimeters of mercury, whereas the second devolatilizer 6 had a temperature of 237° C. and a pressure of about 100 millimeters of mercury. The feed stream was introduced through line 16 through the monomer preheat stage 1. The feed stream contained 14 weight percent of SOLPRENE 308, 49 weight percent styrene, 18 weight percent acrylonitrile, 18 weight percent ethyl benzene, 1 weight percent mineral oil and 0.3 weight percent IRGANOX 1076.

Through line 17 was introduced 0.35 weight percent of alpha-methylstyrene dimer which acted as a chain transfer agent. Water, 2 percent by weight based on the total weight of the feed stream, was added through line 18 to line 19 connecting reactors 1 and 2. Line 20 was employed to introduce a free radical catalyst which was 1,1-ditertiary-butylperoxycyclohexane in a quantity of 150 parts per million of the feed stream. Line 21 entering zone 8 of the first reactor 2 was employed to introduce a recycle stream which was the organic condensate obtained from the devolatilizers 5 and 6. The recycle stream comprised 66 weight percent ethyl benzene, 10 weight percent acrylonitrile and 24 weight percent styrene. The recycle stream was 5.35 weight percent of the feed stream. Phase inversion occurred in the first reactor, that is rubber particles separated from the stream as styrene and acrylonitrile polymerized. The polymerizing stream was discharged from zone 9 of the second reactor containing about 27 weight percent solids. Line 22 connects the discharge zone 9 of the reactor 2 with inlet zone 10 of reactor 3. About 0.12 weight percent of normal dodecylmercaptan was introduced into line 22. The polymerization stream was discharged from zone 12 into line 23 which connected zone 12 of reactor 3 with the inlet zone 13 of reactor 4. The polymerizable stream was about 43 weight percent solids in line 23. Line 24 connected the discharge zone 15 of reactor 4 with the first devolatilizer 5. Volatile materials from devolatilizer 25 were discharged through line 25 to a condenser not shown. Line 26 connects the discharge of the devolatilizer 5 with the inlet of devolatilizer 6 and line 27 removed volatile materials from the devolatilizer 6 to condenser and recycle pump not shown. A discharge line 28 removed heat plastified rubber reinforced polymer from the devolatilizer 6 to cooling extrusion and pelleting equipment not shown. Two polymerization runs were conducted, one with water and one without water. The one with water employed 2 weight percent water based on the weight of the feed stream. The results are set forth in the following Table II.

TABLE II

| O | H$_2$O Injection to ABS Product | |
|---|---|---|
| | Without H$_2$O | With H$_2$O |
| Ty | 4200 | 4813 |
| Tr | | 3966 |
| E % | 8.5 | 14 |
| Izod | 6.4 | 7.45 |
| MFR | 2.0 | 2.17 |
| D$_v(\mu)$ | ~1.1 | 1.2 |

Ty is the tensile yield strength in pounds per square inch.
Tr is the tensile rupture.
E % - percent elongation at rupture.
Izod indicates the izod impact strength in foot pounds per inch of notch.
MFR indicates the melt flow rate as determined in accordance with American Society for Testing Materials Standard D 1238-62T under condition I.
D$_v(\mu)$ indicates the approximate particle size of the rubber particles in microns.

It can be readily seen from Table II that the tensile yield strength is significantly increased employing water, the elongation is significantly increased; the izod impact strength is substantially increased together with a modest increase in the melt flow rate.

In a manner similar to the foregoing illustrations, similar beneficial results are obtained when the hereinbefore delineated monomers are employed in place of styrene and acrylonitrile, in a polymerization process in accordance with the present invention.

As is apparent from the foregoing specification, the present invention is susceptible of being embodied with various alterations and modifications which may differ particularly from those that have been described in the preceding specification and description. For this reason, it is to be fully understood that all of the foregoing is intended to be merely illustrative and is not to be construed or interpreted as being restrictive or otherwise limiting of the present invention, excepting as it is set forth and defined in the hereto-appended claims.

What is claimed is:

1. In a process for the preparation of a rubber reinforced alkenyl aromatic monomer, monoolefinically unsaturated nitrile copolymer wherein a polymerizable mixture of an alkenyl aromatic monomer and a monoolefinically unsaturated nitrile is provided, a diene rubber dissolved in the alkenyl aromatic monomer-mono olefinically unsaturated nitrile monomer to form a rubber containing polymerizable solution, heating the solution to initiate free radical polymerization, agitating the solution during at least the initial portion of the heating and polymerization until the rubber separates and forms a plurality of particles dispersed within a solution of alkenyl aromatic monomer-nitrile polymer dissolved in alkenyl aromatic monomer-olefinically unsaturated nitrile mixture, continuing the polymerization of the alkenyl aromatic monomer and olefinically unsaturated nitrile to at least about 50 weight percent conversion of the alkenyl aromatic monomer and olefinically unsaturated nitrile polymer to thereby form at least a partially polymerized reaction stream, removing volatile materials from the reaction stream, and recovering therefrom a copolymer of alkenyl aromatic monomer monoolefinically unsaturated nitrile copolymer reinforced by a plurality of rubber particles dispersed in the polymer, the particles having incorporated therein occlusions of the polymer of the alkenyl aromatic monomer and olefinically unsaturated nitrile, the improvement which comprises including within the polymerizable stream a minor proportion of water prior to the formation of the rubber particles and maintaining the polymerizable stream under a pressure sufficient to prevent vaporization of the water whereby a polymer of alkenyl aromatic monomer and olefinically unsaturated nitrile reinforced with rubber is obtained which has improved properties over polymer which is obtained in the absence of water.

2. The process of claim 1 wherein the alkenyl aromatic monomer is styrene.

3. The process of claim 1 wherein the nitrile is acrylonitrile.

4. The process of claim 3 wherein the alkenyl aromatic monomer is styrene.

5. The process of claim 4 wherein the weight ratio of styrene to acrylonitrile varies from about 85 to 15 to 40 to 60.

6. The process of claim 1 wherein the rubber is from about 10 to 30 percent by weight of the combined weight of alkenyl aromatic monomer and nitrile monomer.

7. The process of claim 1 wherein the rubber is a diene rubber.

8. The process of claim 1 including a diluent which is generally nonreactive under polymerization conditions.

9. The process of claim 1 wherein the temperature of the process is maintained generally between 80° and 170° C.

10. The process of claim 1 including the step of employing a free radical generating initiator.

11. The process of claim 9 wherein polymerization is accomplished by thermal polymerization.

12. In a process for the preparation of a diene rubber reinforced polymer of styrene and acrylonitrile wherein a polymerizable mixture of styrene and acrylonitrile is provided wherein the weight ratio of styrene acrylonitrile is from about 85 to 15 to about 40 to 60, and 10 to 30 weight percent of a diene rubber based on the weight of the styrene and acrylonitrile is dissolved in the styrene and acrylonitrile to form a rubber containing polymerizable solution; heating the solution to a temperature of between 80° and 170° C. to initiate free radical polymerization; agitating the solution during at least the initial portion of the heating and polymerization until the diene rubber separates and forms a plurality of particles dispersed within a solution of styrene-acrylonitrile polymer dissolved in a mixture of styrene and acrylonitrile; continuing polymerization of the styrene and acrylonitrile to at least about 50 weight percent conversion of the styrene and acrylonitrile to polymer, to thereby form at least a partially polymerized reaction stream; removing volatile materials from the reaction stream, and recovering therefrom a copolymer of styrene and acrylonitrile reinforced by a plurality of diene rubber particles dispersed in the polymer, the particles having incorporated therein occlusions of styrene acrylonitrile polymer, the improvement which comprises including within the polymerizable stream a minor proportion of water prior to the formation of the rubber particles, and maintaining the polymerizable stream under pressure sufficient to prevent vaporization of the water whereby a rubber reinforced polymer of styrene and acrylonitrile is obtained which has improved properties of polymer which is obtained in the absence of water.

* * * * *